Dec. 9, 1941.  M. MAUL  2,265,441
RECORD CONTROLLED SORTING MACHINE
Filed April 22, 1940    8 Sheets-Sheet 1
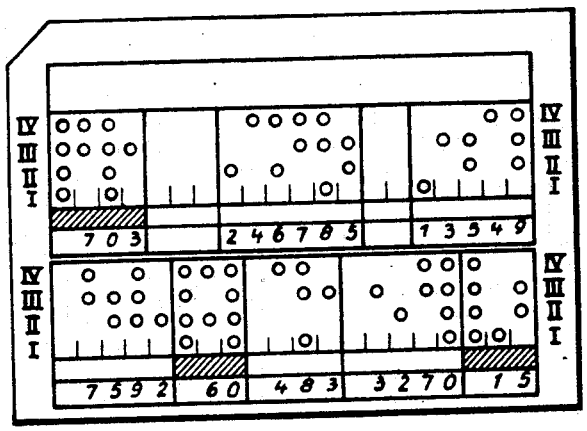
*Fig. 1*
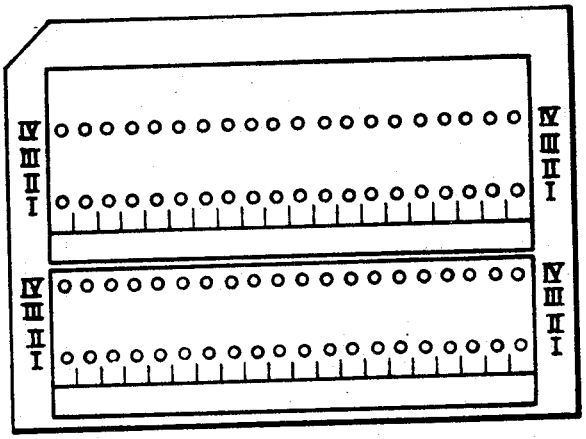
*Fig. 2*
*Fig. 3*
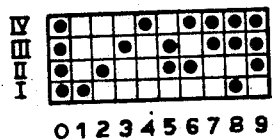
INVENTOR.
Michael Maul
BY
ATTORNEYS.

Dec. 9, 1941.  M. MAUL  2,265,441
RECORD CONTROLLED SORTING MACHINE
Filed April 22, 1940  8 Sheets-Sheet 2
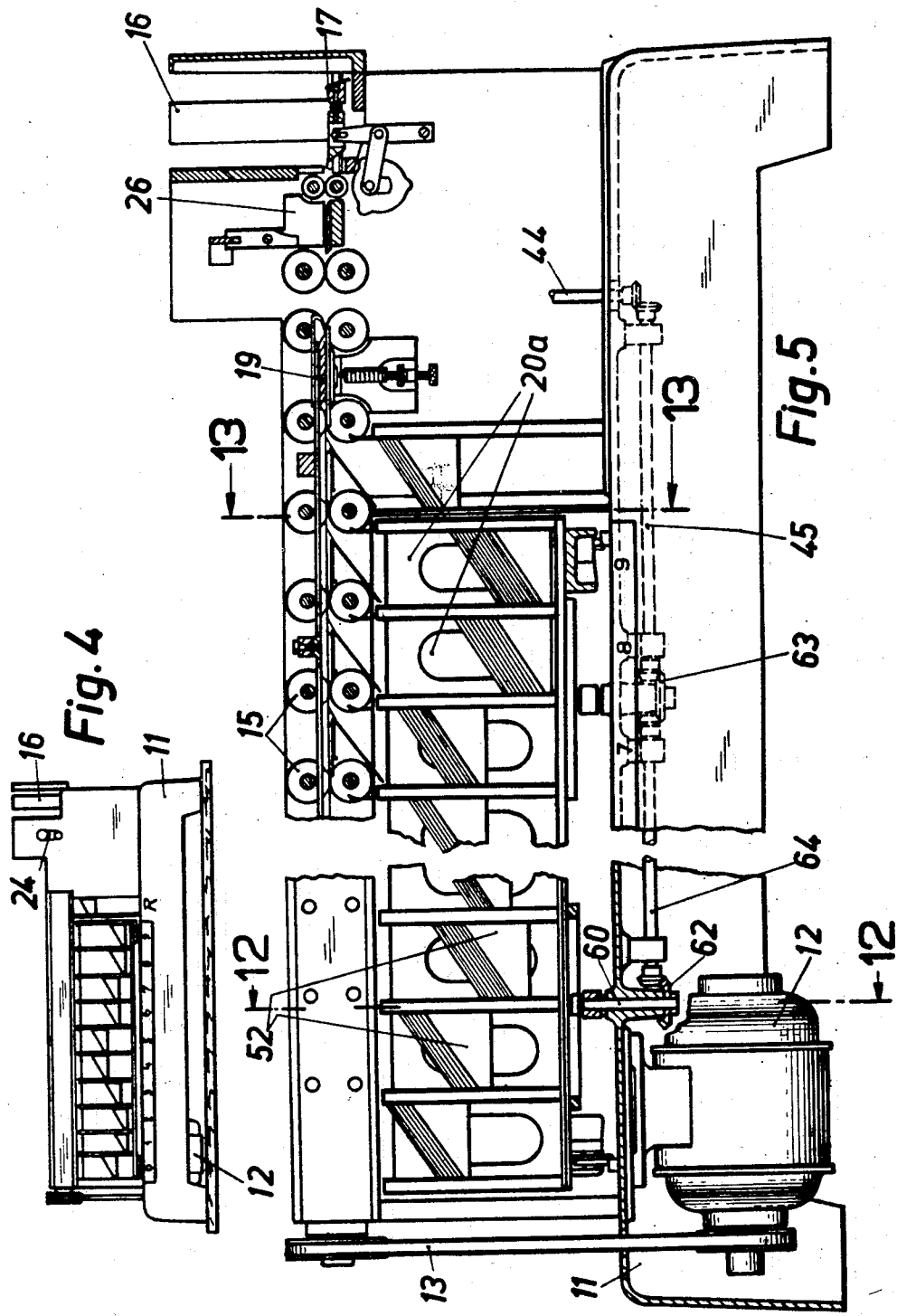
INVENTOR.
Michael Maul
BY
ATTORNEYS.

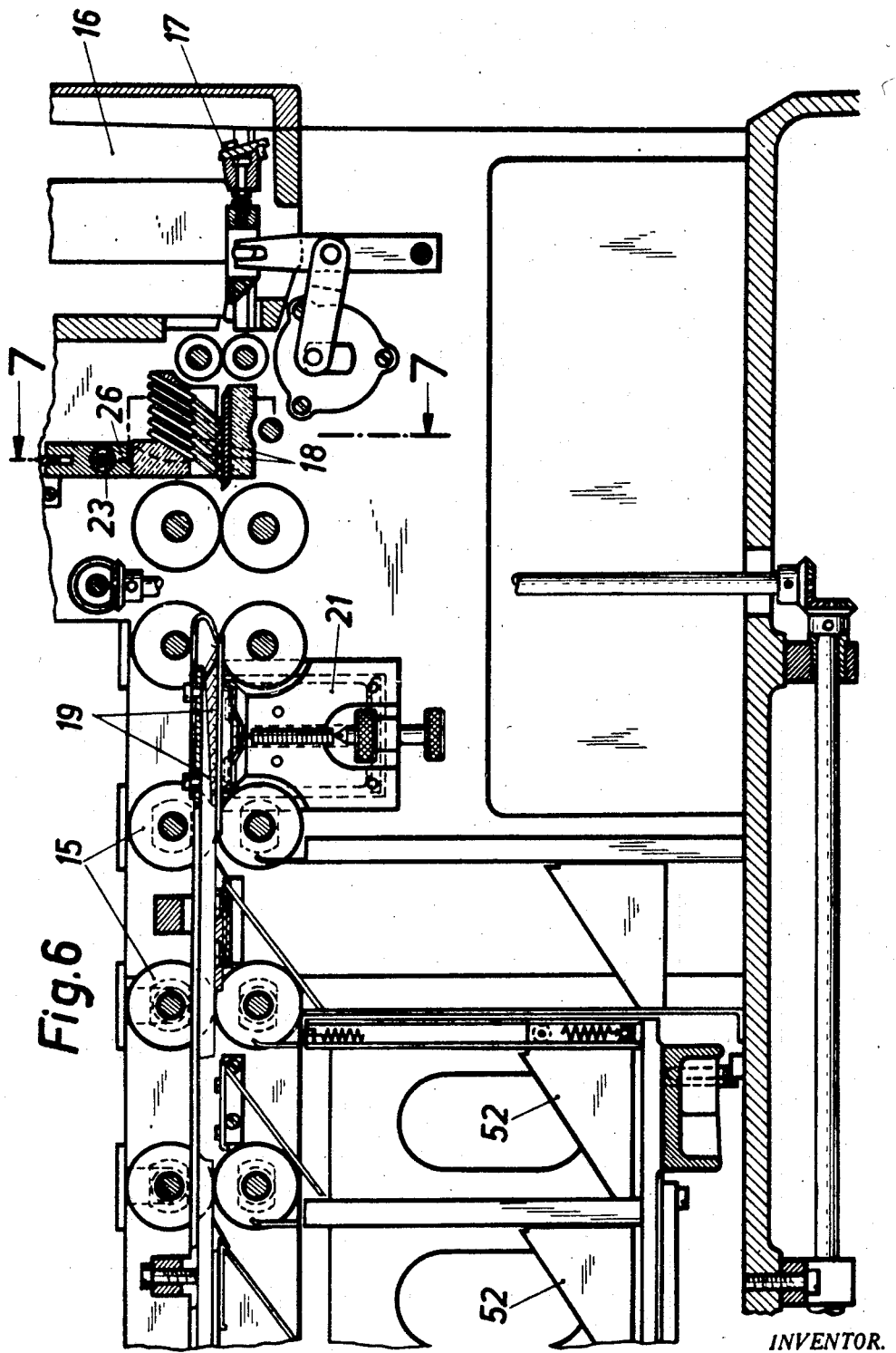

Dec. 9, 1941. M. MAUL 2,265,441
RECORD CONTROLLED SORTING MACHINE
Filed April 22, 1940 8 Sheets-Sheet 4
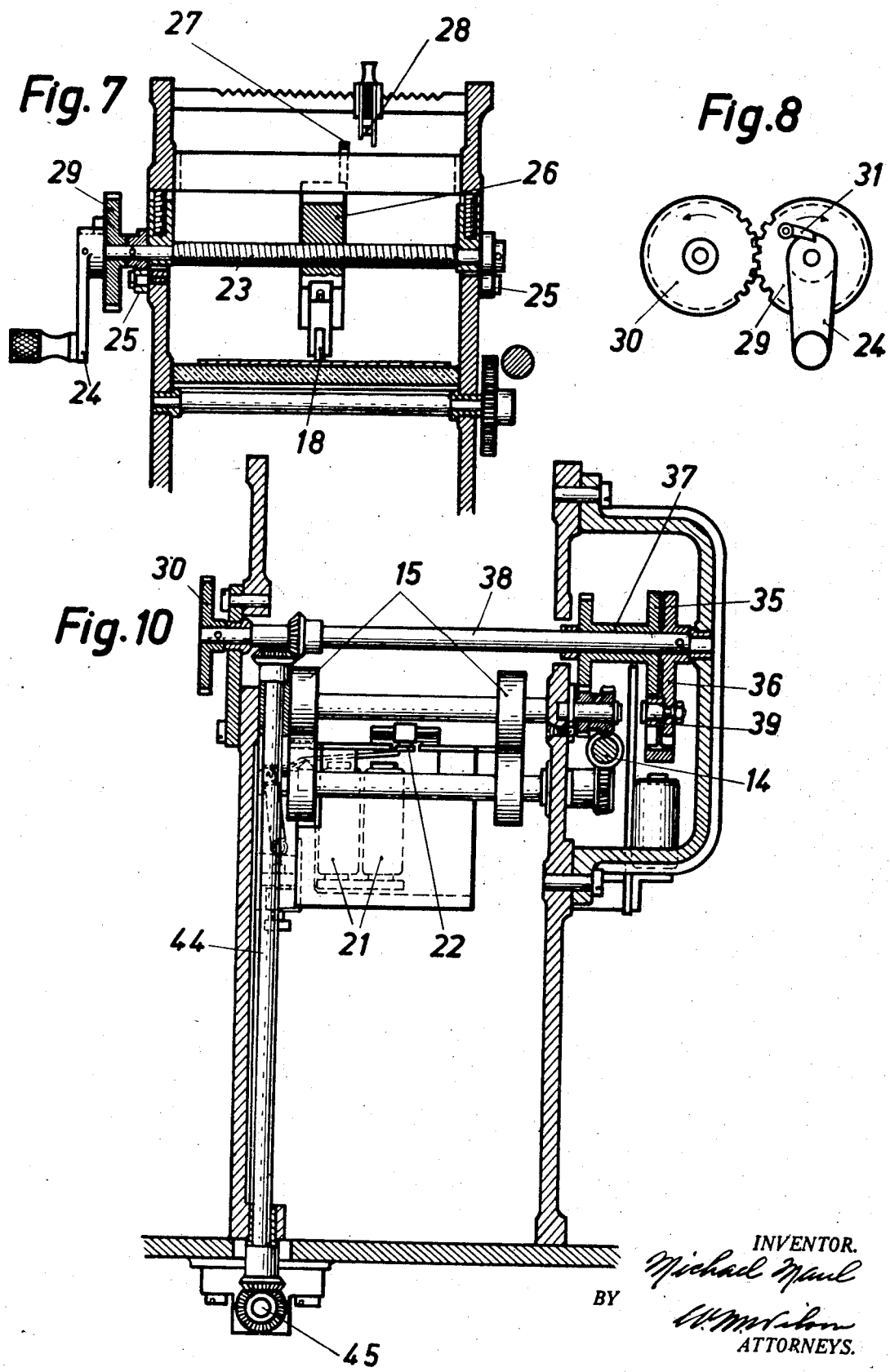

Dec. 9, 1941. M. MAUL 2,265,441
RECORD CONTROLLED SORTING MACHINE
Filed April 22, 1940 8 Sheets-Sheet 6

INVENTOR.
Michael Maul
BY
W. M. Wilson
ATTORNEYS.

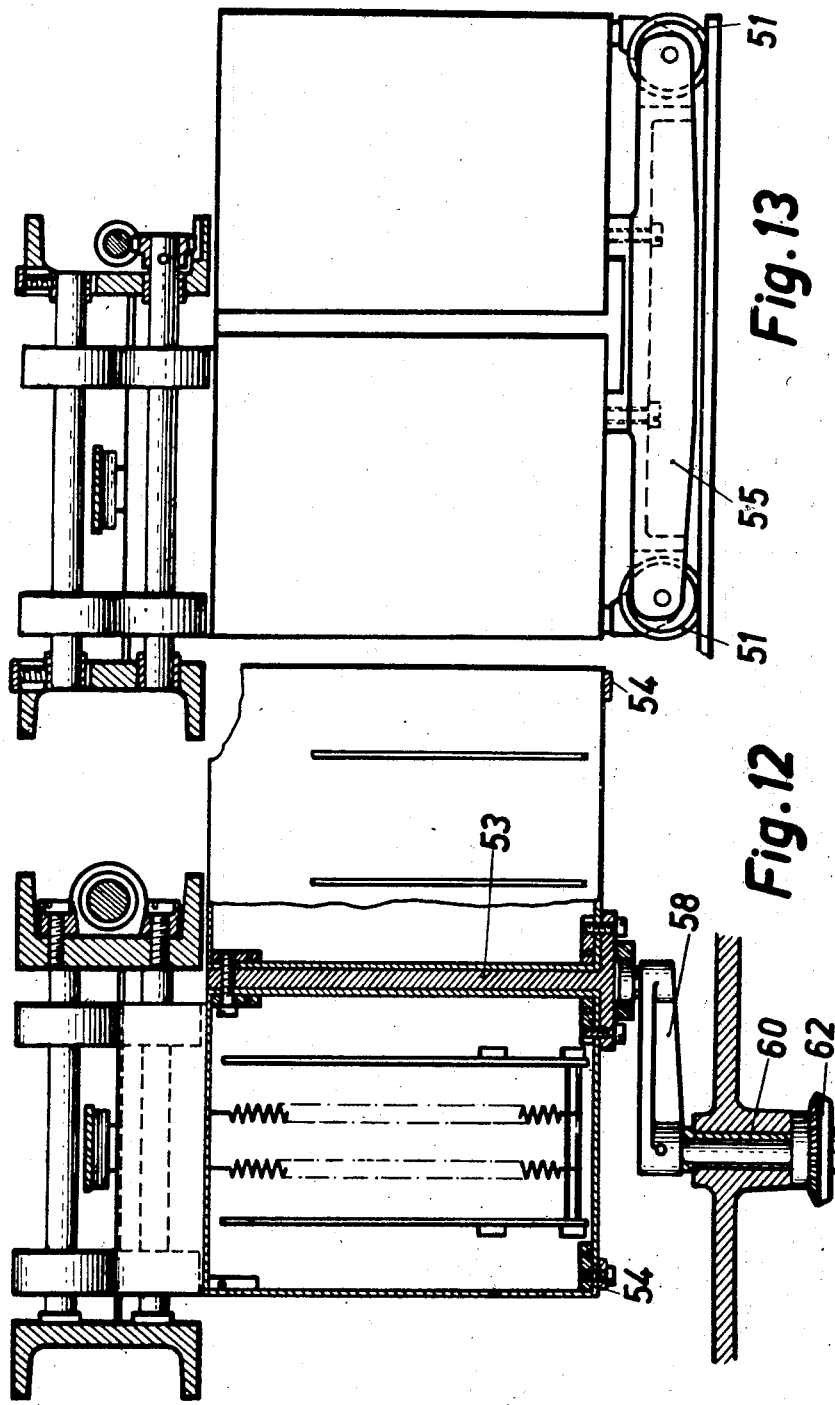

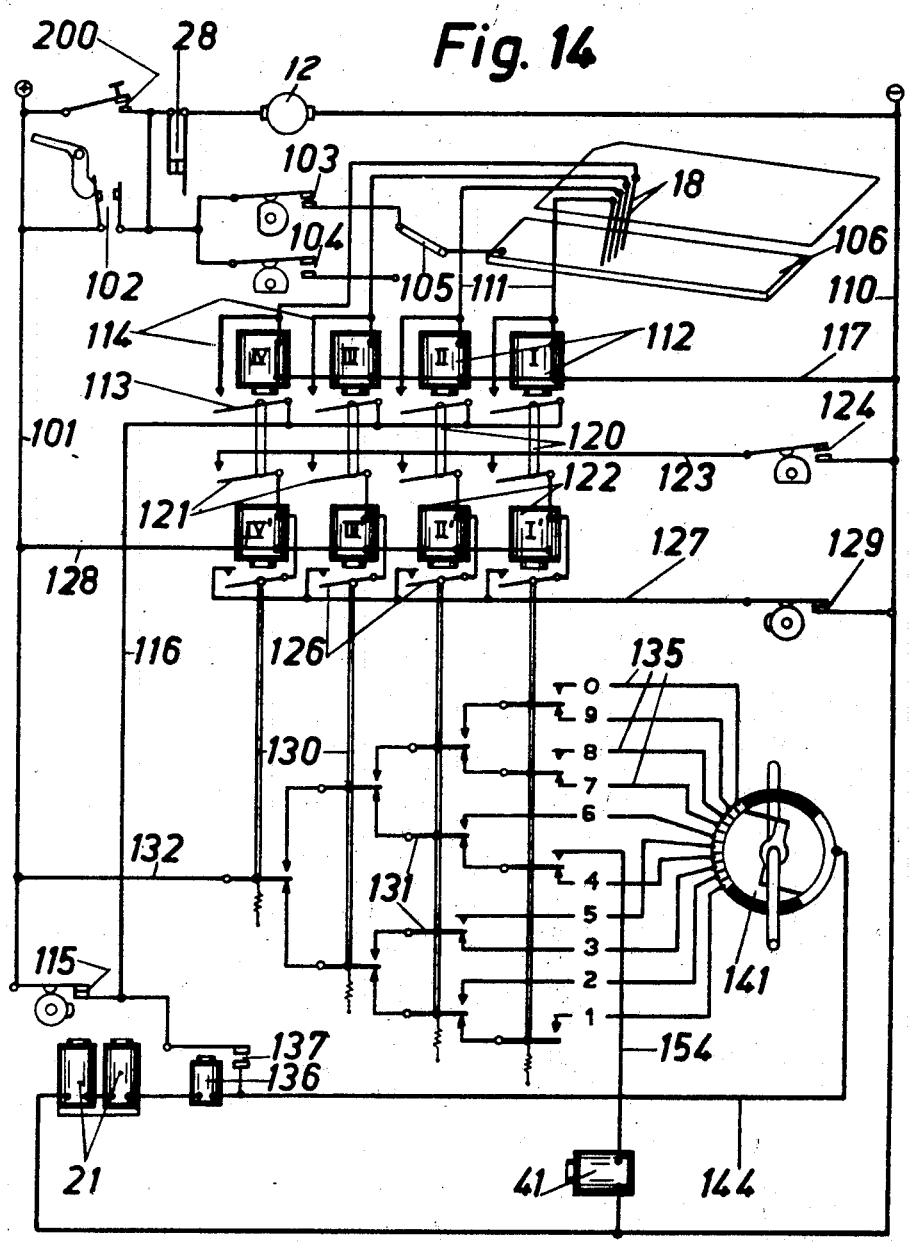

UNITED STATES PATENT OFFICE 2,265,441

RECORD CONTROLLED SORTING MACHINE

Michael Maul, Berlin-Johannisthal, Germany, assignor to the firm Deutsche Hollerith Maschinen Gesellschaft m. b. H., Berlin-Lichterfelde, Germany Application April 22, 1940, Serial No. 330,915
In Germany May 15, 1939

6 Claims. (Cl. 209—110)

The present invention relates to sorting machines and particularly of the type which is capable of effecting sorting operations in accordance with the analysis of designations on records which are to be sorted.

In order to understand the position of this invention with respect to the prior art, a brief statement will be given outlining the developments of sorting machines up to the present time.

The first form of sorting machine comprises a plurality of sorting pockets into which records are manually inserted in accordance with the designations on the records and which are indicated thereon so as to be visible and readable by a person. In accordance with the classification designations on these records the operator manually places the records in the desired pockets. This form of sorting machine, if it can be so-called, has obvious limitations, and is only utilized when it is desirable to sort records in accordance with a few classifications, and further, this type of sorting operation is only utilized when time limitations is not an involved factor.

Further developments in this art consisted in the devisement of means to enable the analysis of the designations on the records, either by mechanical or electrical elements so that certain portions of the machine are responsive to the analysis and accordingly control sorting operations of the machine. Upon the realization of this development further developments led to the construction of a sorting machine which included automatic card feed and also the automatic sorting of the records in accordance with the classifications of the designations. Such forms of sorting machines are well known in the art and their mode of operation and construction need not be explained in detail.

In order to obtain a general understanding of the operation of such forms of machine it is explained that in types of machines which are adapted to sort record cards in accordance with digits represented thereon and which are of different denominational orders, sorting operations are initiated by causing sorting to be effected under control of the digits of the lowest denominational order. This is selected by the operator by providing an initial correlation between the analyzing device and the card column of the lowest denominational order. The operator may then start sorting operations and the records will be directed into the sorting pockets until all have been sorted whereupon the machine is stopped in its operation. By manual adjustment the next higher denominational order of the card columns is selected for sorting operations and after the sorted records have been removed from the sorting pockets and re-placed in the supply hopper in the digital sequence in which they have been sorted, the second sorting run is effected. The above mode of operation is repeated until sorting has been successively effected under control of all the card columns. The repeated starting, stopping, and re-starting of the machine, with the required intervention of the operator to perform certain tasks or settings manually, prevented heretofore the high speed of sorting operations which is especially desirable when a large amount of work is at hand.

It is, therefore, the main object of the invention to provide in sorting machines of the type last described, a number of improvements which will be set forth in detail hereinafter and which tend to the further automatization of sorting operations so that the sorting operations will flow automatically without interruption and, when once initiated, will continue automatically until the sorting job is completed.

An attempt to provide a machine of this type which has the same desirable characteristics with respect to automatic sorting operations has previously occupied the attention of others skilled in the art, and a representation of one embodiment is shown in the German Patent No. 351,030. In the machine shown in this patent, sorting operations are effected under control of designations which represent letters and the sorting arrangement is devised to automatically effect a plurality of sorting runs so as to sort and re-sort the cards in accordance with the alphabetical designations to arrange the cards in a desired alphabetical sequence. Between successive sorting runs, a control card is passed through the machine which effects the automatic selection of the next column which is to control sorting operations.

The arrangement disclosed in this patent is, however, objectionable in not only its construction, but also its mode of operation. In this patent, in order to obtain the desired result it is necessary to effect sorting operations starting with the first card column at the left and continue successive sorting operations column by column to the right. This arrangement, of course, cannot be utilized in the present machine which effects sorting in accordance with the digits since for the desired sequence of the cards it is necessary to effect sorting operations commencing at the card column representing the digit of the lowest denominational order. In the operation of the machine shown in the German Patent No. 351,030, the records are sorted into thirty-two sorting pockets, this being the number of classification designations. Obviously, a sorting machine which is constructed with an inordinate number of sorting pockets is cumbersome and since they are necessarily arranged vertically, one above the other, the undue height of the machine results in the construction of a machine which would not be practical for commercial use. This objection is furthermore augmented by the provision of a special pocket into which all of the sorted records are directed at the termination of each sorting run. This special pocket must, of course, be as large in capacity as the individual sorting pockets.

To accomplish the purposes of this invention it is a further object of the present invention to construct a sorting machine which is capable of enabling sorting operations to continue automatically without interruption and to provide in this improved form of sorting machine an arrangement which overcomes the objections to the machines of the prior art, as has just been described.

More specifically, it is an object of the present invention to provide a sorting machine with two rows of sorting pockets and to provide a selectively controlled mechanism which is capable of effecting the automatic selection of one of the sets of sorting pockets after each sorting run.

A still further object of the present invention is to provide a sorting machine with two rows of sorting pockets and to effect, during the passage of a control card which is the last record of the records sorted during a sorting run, the successive selection of the sorting pockets.

A still further object of the present invention is to provide a sorting machine with two sets of sorting pockets and to successively correlate them with the sorting mechanism so that during the time records are directed into one series of sorting pockets, records may be removed from the other series of pockets and placed in the supply hopper so that sorting operations will automatically continue and without interruption of the operation of the machine.

A still further object of the present invention is to provide a sorting machine with two series of sorting pockets and a selectively operated mechanism which is responsive to the termination of a sorting run and which will select the next series of sorting pockets to be utilized and concomitantly select the next card column which is to control sorting operations.

A still further object of the machine is to provide a controlling device for the driving means of the machine which is responsive to a change in a settable element effected after sorting operations are completed under control of the last card column to terminate the operation of the driving means and, therefore, sorting operations for the machine.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a representation of the preferred form of record card capable of being sorted by the present machine. Certain of the fields of the record which are utilized for sorting control are particularly identified by cross-hatching so as to call special attention to the fact that in such fields the zero is also represented by combinational holes.

Fig. 2 represents the preferred form of control card which controls certain novel functions to be effected by the present machine. These functions are performed under control of perforations arranged along two horizontal rows. It will be noted that these perforations are different in their arrangement than the arrangement of the perforations shown in the code of Fig. 3 for representing the different digits.

Fig. 3 shows the code arrangement of the perforations for representing the series of digits 0 to 9, inclusive.

Fig. 4 is a front view of the assembled sorting machine.

Fig. 5 is a fragmentary longitudinal sectional view of the sorting machine.

Fig. 6 is a fragmentary sectional view taken at the right end of the machine and is on an enlarged scale with respect to Fig. 5. This view shows in great detail the card feeding mechanism, the analyzing brushes, and the association of the card sorting blades with several of the card receiving pockets.

Fig. 7 is a sectional view taken on the line 7—7 of Fig. 6 and shows in detail the means for manually selecting a card column which is to control initial sorting operations.

Fig. 8 is a detail view showing a part of the driving mechanism utilized to effect the automatic selection of the card columns which are to control sorting operations.

Fig. 10 is a transverse sectional view taken on the line 10—10 on Fig. 9 and shows particularly the driving connections for effecting the selection of the rows of sorting pockets.

Fig. 12 is a sectional view taken on the line 12—12 of Fig. 5.

Fig. 13 is a sectional view taken on the line 13—13 of Fig. 5.

Fig. 14 is an electrical wiring diagram of the machine.

General operation of the machine

Figure 9:
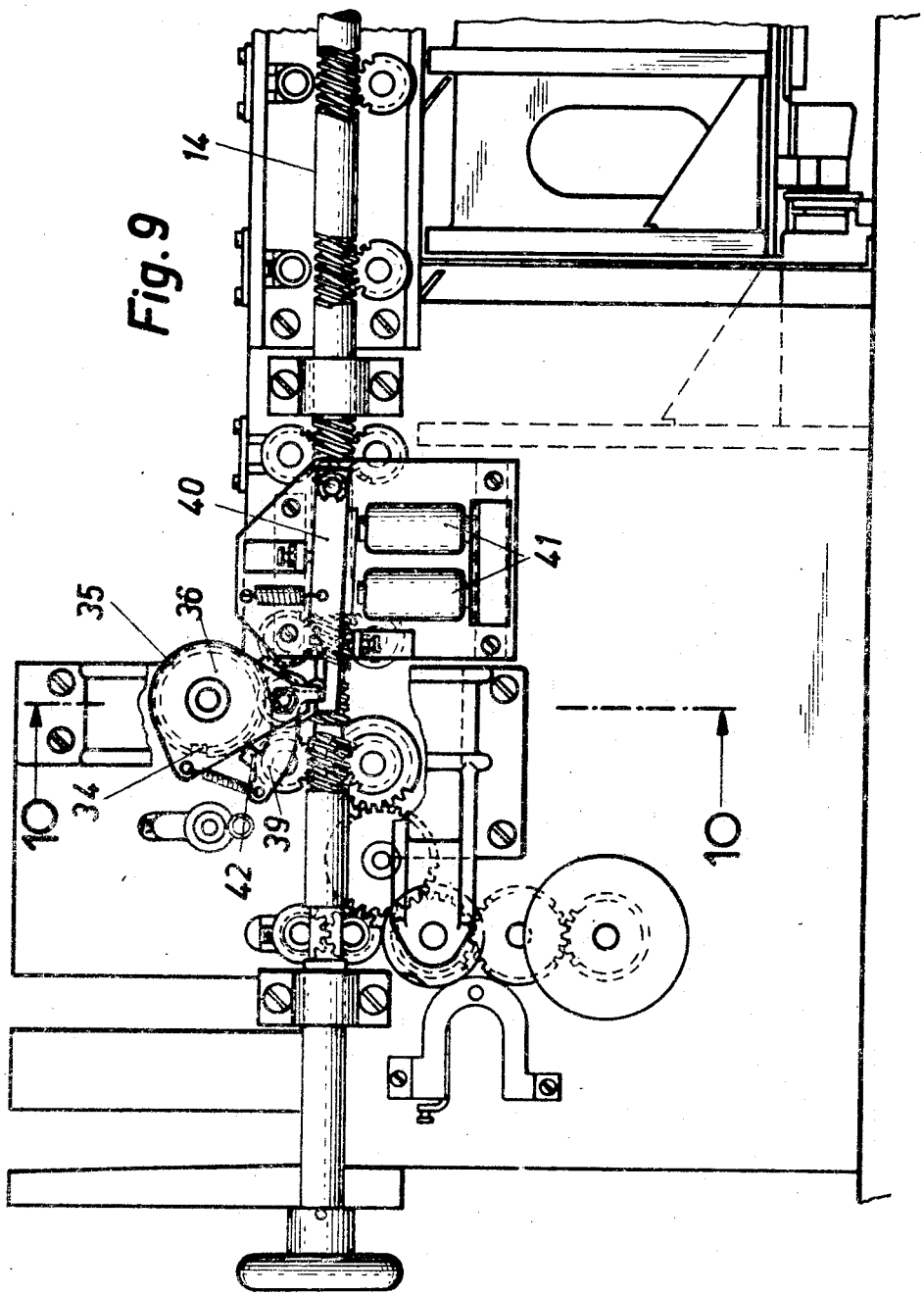
Fig. 9 is a fragmentary view in side elevation and shows particularly the one revolution clutch which is provided for the machine and which upon its release is adapted to effect the selection of the desired row of sorting pockets and to cause the adjustment of the analyzing brushes so as to concomitantly select the next card column to control sorting operations.

In order that the operation of the machine may be better understood as the specification progresses, a general description will be given of its mode of operation.

The series of records which are to be sorted are first placed in the supply hopper and the machine is conditioned so that sorting operations may be effected under control of the first card column and which, in the present machine, is the column representing the lowest denominational order digits. The operator then initiates the operation of the machine and sorting operations will be automatically effected and the records will be directed to one series of sorting pockets.

A special control card is placed upon the uppermost perforated record which is to be sorted and when this control card passes through the machine there will be a change of sorting pockets and concomitantly the next column to control sorting will be selected and also the next series of sorting pockets will be correlated with the sorting mechanism. However, before the machine is conditioned in this manner the operator has taken some of the cards out of the "0" sorting pocket and has inserted them in the supply hopper on top of the control card. Obviously, after the passage of the control card through the machine these records will be sorted thereby preventing any interruption of the operation of the machine. With the machine continuing in operation, the operator will remove the sorted records from the other sorting pockets and place them in the supply hopper in their digital sequence. The records are therefore re-sorted into the second set of sorting pockets and the same control card or another control card is placed upon the last perforated records of the second sorting run so as to continue the operation of the machine for effecting the third sorting operation.

Obviously, the operator can be kept busy by taking the sorted records out of one series of sorting pockets, replacing them in the hopper so that the machine may continue automatic sorting runs under column by column control until all the necessary sorting runs have been effected.

If so desirable, an indicator may be placed upon the machine so that the machine operator will recognize when the last sorting run is being effected and the operator will, of course, leave the record cards which are sorted during the last sorting run in the sorting pockets. After the last sorting run has been effected, the control card again passes through the machine and the next series of sorting pockets will be selected, but in this case, since no more records will pass through the analyzing device, means will be responsive to this condition in the machine to cause the automatic termination of the operation of the machine. By taking the records out of the sorting pockets from the series presented to the operator after the cards have been sorted for the last time, and placing them in a single stack in a digital sequence, the record cards will be found to be finally sorted in a true serial numerical order.

*Sorting operations of the machine*

Mounted beneath the base plate 11 of the machine is the driving motor 12 (Fig. 5), the armature shaft of which drives through a belt connection 13, a spindle 14 which is provided with worm wheel portions, as best shown in Fig. 9. The worm wheel portions of spindle 14 drive the plurality of sets of card feeding rollers 15 which are best shown in Figs. 5 and 6.

The record cards which are to be sorted are placed in a supply hopper 16 (Fig. 6) and by means of a reciprocable picker 17 the cards are fed singly from the bottom of the supply hopper to the analyzing brushes 18, the leading edge of the card then being engaged by the second set of card feeding rollers 15. When the perforations of the selected card column, which is to control sorting operations, are operatively related to the plurality of analyzing brushes 18 an electrical impulse is directed to the brushes 18 in order to effect the analysis of the perforations to control subsequent sorting operations. In accordance with the analysis of the card perforations sorting operations are effected during a subsequent cycle of machine operation.

The sorting of the card is effected in a manner which is well known in the art and includes a plurality of sorting blades 19 which terminate at their left ends at the respective sorting pockets. When the card leaves the analyzing brushes 18, it is fed to the sorting blades 19 and the card is interposed between the right ends of the sorting blades and an armature 22 (Fig. 10) of a sorting control magnet 21. The latter has directed to it, at a differential time in the cycle of machine operation, an electrical impulse which causes the energization of the sorting magnet 21 and the latter will draw its armature 22 downwardly. At this time certain of the sorting blades will be held up by the leading edge of the card and certain of the sorting blades will drop downwardly due to the lowering of the armature 22. This will cause a separation between certain of the sorting blades and the card will be directed under control of these sorting blades until the card reaches a sorting pocket into which it is to be sorted.

Referring to Fig. 14, when the sorting magnet 21 is energized a relay 136 will also be energized and the latter will close stick contacts 137 thereby retaining the energization of the sorting magnet 21, this stick circuit being closed through cam contacts 115. At the end of the cycle in which a card is sorted cam contacts 115 will open thereby effecting the deenergization of the sorting magnet 21 and the relay magnet 136. The above described mechanism for sorting the cards is only generally described herein as it is well known in the art and is fully shown and described in the patent to Michael Maul, No. 2,025,602, dated December 24, 1935, to which reference may be had for further details of construction and operation.

Figure 11:
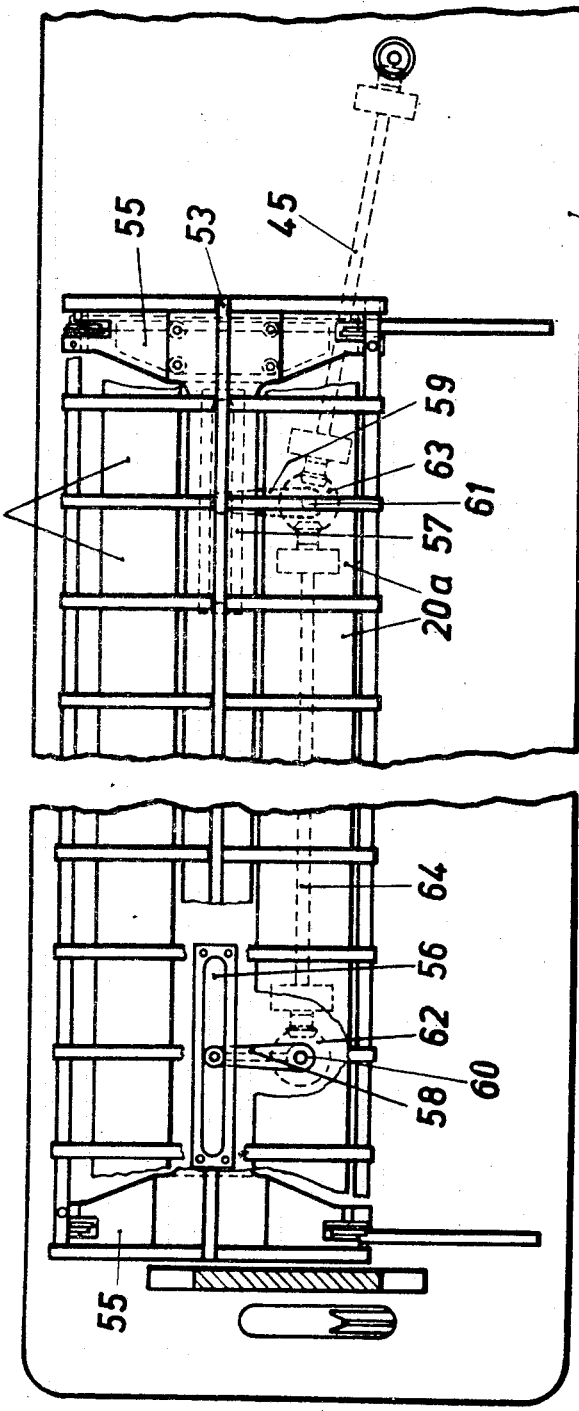
Fig. 11 is a plan view of the carriage which supports the two rows of sorting pockets and also shows in detail the operating connections for selecting the desired longitudinal rows of sorting pockets.

However, in the present machine, there is provided two rows of sorting pockets which are best shown in Fig. 11 and are designated by the reference numerals 20a and 20b. The two rows of sorting pockets are longitudinally arranged and are supported by a carriage which may be reciprocated so as to selectively correlate the desired row of sorting pockets with the sorting blades 19 so that in one sorting run one row of sorting pockets may receive the sorted cards, and in another sorting run, for the next card column, the other row of sorting pockets may receive the cards to be sorted. The manner in which this is performed will be subsequently described in detail.

*Manual selection of initial card column which is to control sorting operations*

The manual selection of the first card column which is to control sorting operations is effected in a manner which is well known in the art but will be described herein in some detail. Referring to Fig. 7, it will be seen that the analyzing brushes are supported by a carrier 26 which is threaded so as to receive a threaded portion of a spindle 23. At one end of the spindle 23 there is secured a crank handle 24 one revolution of which is adapted to displace the analyzing brushes 18 laterally the distance of one card column.

As shown in Fig. 7, the ends of the spindle 23 have attached thereto a plurality of cams which cooperate with stationary rollers 25. As the spindle 23 is initially rotated by the crank handle 24 the cooperation of the cams with the rollers 22 will first elevate the brush holder 26 so as to position the brushes 18 above the card, and as the crank handle is further rotated the brush carrier 26 will be shifted laterally so as to correlate the brushes 18 with the next card column, and when this correlation is obtained further rotation of the cams by the crank handle will permit the lowering of the brush carrier 26 so that the brushes 18 will now engage the perforations at the next card column. The above arrangement is so designed that a single revolution of the crank handle will effect the lateral positioning of the brushes 18 to the extent of one card column.

*Successive automatic selection of card columns which are to control sorting operations*

The last described setting devices are employed for the purpose of effecting the manual positioning of the analyzing brushes 18 to the first card column which is to control sorting operations. When sorting operations have been effected under control of the first card column it has been the usual custom to select the next card column by the manual positioning of the brushes 18 in the manner just described. In the present machine the selection of successive card columns is effected automatically and without attention of the operator. The means for accomplishing this function will now be described in detail.

Referring to Fig. 10, it will be noted that one of the threaded portions of the spindle 14 is adapted to drive through an idler gear a gear which is integral with a sleeve 37. The sleeve 37 is loosely mounted upon a shaft 38 and the sleeve 37 is provided with an integral disc 35 which is provided with a notch 34 (see Fig. 9). Secured to the shaft 38 is a disc 36 upon which is pivotally mounted a clutch pawl 39 which is adapted upon its release to be urged by a spring so that a tooth 42 of the pawl will enter the notch 34 thereby effecting a clutch engagement between the disc 35 and the disc 36.

The release of the clutch is effected by the energization of a magnet 41. When the clutch control magnet 41 is energized the armature thereof, which is formed as a latch arm 40, is drawn downwardly so as to release the pawl 39. The latter is then rocked by a spring so that the tooth 42 will engage the notch 34 of the disc 35. This will effect a clutch engagement so that the shaft 38 will be rotated a complete revolution.

At the termination of the single revolution of the shaft 38 the pawl 39 will be engaged by the extremity of the arm 40 which is now at its normal position thereby disengaging the tooth 42 of pawl 39 from notch 34 and this disengagement will be retained until magnet 41 is subsequently energized.

Secured to one end of the shaft 38 is a gear 30 (see Fig. 8) which meshes with a gear 29 upon which is pivotally mounted a pawl 31 which is adapted to engage a notch formed in the hub of the crank handle 24. Obviously, by effecting a single revolution of the shaft 38 the gear 29 will be rotated clockwise through the intermediate gear 30 a complete revolution so that through the pawl 31 the crank handle 24 will be rotated a complete revolution. This will, by the means previously described, laterally displace the analyzing brushes 18 the distance of one card column and this operation will be effected automatically by controlling means which will be subsequently described in detail hereinafter.

Referring to Fig. 7, it will be noted that the brush carrier 26 is provided with a block 27 of insulating material which is adapted, after successive movements of the carrier 26, to engage one blade of contacts 28 and open the latter. From Fig. 7, it will be noted that contacts 28 are adjustably mounted upon a serrated bar and the contacts 28 are so positioned that after the sorting operations have been effected for the last card column the movement of the carrier 26 one step to the right, as shown in Fig. 7, will through the block 27 cause the opening of contacts 28. The function of the contacts 28 will be subsequently described in detail.

*Automatic selection of rows of sorting pockets*

The present machine is preferably equipped with a selecting mechanism whereby the rows of sorting pockets may be automatically selected and concomitantly with the successive selection of the card columns which control sorting operations. The successive selection of the sorting pockets is effected by mechanism operated by the shaft 38 which, it will be recalled, is driven a complete revolution upon the release of the clutch which is controlled by the magnet 41.

Referring to Fig. 10, it will be seen that shaft 38 has a bevel gear connection to a vertically mounted shaft 44 and the latter, in turn, has a bevel gear connection with a transversely mounted shaft 45.

The carriage which carries the sorting pockets is best shown in Figs. 11, 12, and 13 to which attention is specifically directed. As previously stated, the machine is provided with two longitudinal rows of sorting pockets, designated 20a and 20b in Fig. 11, each row of pockets consisting of ten pockets and each pocket having a resiliently mounted base plate 52 (Fig. 6). The two rows of sorting pockets are supported by a T-shaped bracket plate 53 which is shown in section in Fig. 12 and in plan view in Fig. 11. The sorting pockets may be attached to the T-shaped bracket plate 53 by any suitable means. In order to provide rigidity to the supporting carriage the sorting pockets are secured together at their bottoms by transverse rods 54, best shown in Fig. 12. The carriage rests upon frame castings 55 which carry the rollers 51. At the lower portion of the carriage there is secured a pair of plates provided with elongated slots 56 and 57 (Fig. 11) respectively, each of which receives a roller of a respective crank arm 58 and 59. The arms 58 and 59 are secured to their respective shafts 60 and 61 which are mounted in the base plate 11 of the sorting machine. The shafts 60 and 61 are interconnected by a shaft 64 which carries at the ends thereof beveled gears meshing with respective beveled gears 62 and 63 attached to the shafts 60 and 61, respectively. The bevel gear 63, which is secured to the shaft 61 has a bevel gear connection to a shaft 45 and the latter, as previously described, has a bevel gear connection to the shaft 44 (see Fig. 10).

It will be recalled that upon the release of the clutch which is controlled by the magnet 41 shaft 38 will be rotated for a single revolution. The operative connection between the shaft 38 and the shafts 60 and 61 is such that a rotation of shaft 38 for a single revolution will effect the rotation of the shafts 60 and 61 an angular movement of 180°. Referring to Fig. 11, it will be seen that a similar angular movement will be imparted to the crank arms 58 and 59 thereby moving the carriage so as to correlate one of the rows of sorting pockets with the card sorting mechanism. When a sorting run for one card column is completed the crank arms 58 and 59 will again be rocked 180° in an opposite direction thereby correlating the other set of sorting pockets with the sorting mechanism so that cards will be sorted into these pockets under control of the next card column which is selected concomitantly with the positioning of the next set of sorting pockets to be utilized.

After cards have been sorted into one of the sets of ten sorting pockets during one sorting run, the operator will remove the cards from these sorting pockets and replace them in the supply hopper thereby enabling the sorting pockets which have been emptied to receive cards which are sorted under control of the successive card column during the next sorting run.

*Explanation of circuit diagram and manner of operation of the machine*

In order to carry out sorting operations in the manner previously described, the operator first places a stack of cards to be sorted in the supply hopper 16. On top of the perforated cards which are to be sorted the operator places several blank cards and upon the uppermost blank card there is placed the control card which is shown in Fig. 2. The above arrangement of cards is made for a reason which will be apparent later on as the description of the operation of the machine progresses. Before the operator starts the machine there will be a preliminary adjustment of the machine so as to select the card field which is to control sorting operations and also to select the particular card column of the selected card field.

The selection of the card column is effected, as previously described, by the rotation of the crank handle 24, shown in Fig. 4, which positions the brush holder so as to coordinate the analyzing brushes 18 with a selected card column. The selection of the card field is effected by suitably positioning a lever 105 (Fig. 14) which selects a desired card field by means which will be presently described.

When these two preliminary adjustments have been made, the operator will initiate the operation of the machine by the depression of a start key 200 which, it is evident from Fig. 14, will close the circuit from the positive line side 101 through the contacts closed by the start key 200, through the control contacts 28, to the motor 12 to the negative line side 110. When the first card has been fed out of the supply hopper it will immediately close card lever contacts 102 thereby providing a stick circuit for the motor 12 enabling the release of the start key 200 but insuring the continued operation of the driving motor as long as cards are being fed from the supply hopper.

Current to the analyzing brushes 18 is transmitted from the positive line side 101 through the card lever contacts 102 to either of two circuits depending upon which card field is to control sorting operations, such card fields being selected, as previously described, by the switch 105. With the switch 105 in the position shown in Fig. 14, current will be transmitted to the brushes 18 by the following described circuit: from the positive line side 101, card lever contacts 102, to cam controlled contacts 103, switch 105 to the contact bed plate 106. Contacts 103 are closed by a cam at a time when the perforations of the upper card field are beneath the brushes 18 thereby closing the circuit at such time to the contact plate 106. However, if the switch 105 is positioned so as to engage a contact point connected to cam controlled contacts 104 and circuit will be closed through contacts 104 to the contact plate 106. The contacts 104 are closed by a cam at a time when the perforations of the lower card field are beneath the brushes 18.

The present machine is adapted to effect the sorting of records of the type shown in Fig. 1 in which it will be noted that the digits are represented by the combinational hole system. The machine is preferably constructed so as to effect the analysis of the combinational holes in one sorting cycle and then in a subsequent sorting cycle effect the sorting operations. While this sequence of operation may be carried out by different forms or means, it is preferable to effect this operation by the utilization of the two sets of storing devices. One set of storing devices is adapted to receive and store up the representation of the combinational holes analyzed and this result is transferred to a second set of storing devices so that the latter may control a sorting operation in the successive operating cycle. After the transfer operation has been effected, the first set of storing devices is cleared out so as to receive and store up the result of the analysis of the next card to be sorted. After the sorting operation has been effected under control of the second set of storing devices the latter is cleared out so as to control sorting operations for the next card.

The above described set-up mechanism is well known in the art and is fully shown and described in the patent to Michael Maul No. 2,025,602, dated December 24, 1935. The present arrangement also utilizes relays for receiving and storing up representations of the combinational holes but differs from that shown in the patent by causing the above described transfer operation to be effected electrically.

From Fig. 14, it will be seen that from the brushes 18 there are electrical connections by wires 111 to respective relays 112. All of said relays have a common wire connection 117 to the negative line side 110.

From Fig. 14, it will be noted that relays 112 are designated by the Roman numerals I to IV and from Fig. 3 it will be seen that the combinational hole designations are also identified by the corresponding Roman numerals. Thus the energization of those relays 112 will be effected which correspond in designation to the combinational holes analyzed.

Each relay 112 when energized will attract its armature 113 thereby closing a stick circuit for the energized relay, this stick circuit being closed from the positive line side 101 through contacts 115, wire 116, the armature 113 of the energized relay, the wire 114, the energized relay 112, wire 117 to the negative line side 110. Hence the relays which are energized will be retained energized until cam controlled contacts 115 subsequently open, and which may be effected after the transfer operation.

The armatures 113 are connected to armatures 121 of the relays 122 of the second set of storing devices by connecting links 120. Obviously, the energization of a relay 112 will effect the movement of an armature 121 to close a circuit connection which will energize a corresponding relay 122 by the following described circuit: from the positive line side 101, wire 128, one of the relays 122, its related armature 121, a contact point in engagement therewith, the common line side connection 123 for relays 122, through cam controlled contacts 124 to the negative line side 110. Cam controlled contacts 124 are adapted to be closed for a short time and during successive operating cycles. This will cause a transfer operation between the relays 112 to the relays 122 and the energized relays 122 will close stick circuits which lead from the positive line side 101, a common line connection 126 for relays 122, an energized relay 122 to an armature 128 of the same relay, to a contact point engaged thereby, a wire 127, to cam controlled contacts 129, to the negative line side 110. Cam controlled contacts 129 are closed during the transfer operation and are retained closed so as to keep the energized relays 122 energized until the completion of the sorting operation which is effected under control of relays 122.

The translating mechanism provided herein is of the type which is well known in the art and fully shown and described in the aforementioned patent to Michael Maul, No. 2,025,602, dated December 24, 1935. In general, the translating mechanism is adapted to effect the translation of the combinational hole representations set upon the relays 122 into a single controlling electrical impulse. As best shown in Fig. 14, when one of the relays 122 is energized a related bar 130 will be elevated and this will cause the opening of certain contacts 131 and cause the closure of other contacts 131. The pyramidical arrangement of contacts 131 and interconnections are such that by closing different contacts 131 and opening other contacts, one of a series of ten digit lines 135, marked 1 to 9 and 0 in Fig. 14, will be selected. Coordinated with the digit lines 135 is a commutator 141 which is timed with the card feed in such a manner that as the leading edge of the card approaches the ends of the sorting blades 19 an electrical impulse will be transmitted to the relay magnet 136 and the sorting control magnet 21. This will effect, as previously described, the separation between certain of the sorting blades and thereby direct the card to a sorting pocket corresponding to the controlling digit.

After the sorting operation has been effected contacts 129 will open thereby effecting the break-down of the relays 122 which have been energized. Contacts 115 are preferably timed to open after the transfer has been effected from the relays 112 to the relays 122 thereby conditioning the relays 112 so that they may be subsequently energized to receive and store up the combinational hole representation of the subsequent card to be sorted.

It will be recalled that the control card shown in Fig. 2 is adapted in its passage through the analyzing means of the machine to effect the energization of the clutch control magnet 41 thereby causing concomitantly the selection of the next sorting column and also the other row of sorting pockets. During the passage of the control card, relays 112 designated by I and IV will be energized and the set-up will be transferred to relays 122 designated by corresponding relays I' and IV'. The set-up of the last mentioned relays will effect the closure of certain of the contacts 131 to cause the closure of a circuit leading from the positive line side 101, wire 132, contacts 131 closed by relay IV' to contacts 131 closed by relay I', to a wire 154, thence to the clutch control magnet 41, to the negative line side 110. The energization of the magnet 41 will initiate the functions above described.

Attention is directed to the fact that when contacts 131 are opened by the relay magnet 122 designated I' the circuit will be closed to the line 154 and no circuit will be closed to the commutator 141 so that during the subsequent sorting cycle the sorting magnet 21 will remain deenergized. This will cause the control card to be directed to a reject pocket designated by R in Fig. 4. This sorting pocket is the usual reject pocket of a sorting machine. In the present arrangement it is preferable to have this pocket located off the carriage and, therefore, always in cooperation with the sorting blades.

Recapitulating, after the initiation of the operation of the machine, sorting operations will be automatically effected for the first card column, which comprises the lowest denominational order, and the records which are sorted under control of the first card column are selectively directed into one set of sorting pockets. These records are then taken out of the pockets, replaced in the supply hopper in the sequence of the digits 0–9 and then under control of the succeeding card column, these records are re-sorted by being directed into the other set of sorting pockets, and so on. In this manner, sorting operations are automatically effected for successive card columns and after the sorting operation has been effected under control of the last card column of the record cards the cards will be arranged in serial numerical order, and contact 28 will be opened in the manner previously described thereby opening the circuit to the driving motor and sorting operations will thereupon terminate. After a sorting run for the last card column there is a change in position of the carriage and the pockets receiving the records sorted in the last run are presented to the operator enabling the records to be withdrawn by the operator and then stacked in the digital sequence in which they are sorted.

The operator of the machine will, therefore, before there is a change of sorting pockets, take the records out of the "0" pocket and immediately replace them in the supply hopper. During the cycle of machine operation the control card passes through the machine the next set of sorting pockets will be selected and since perforated records will immediately follow through the analyzing means, sorting operations will automatically continue under control of the next card column. In the event that there is passed through the machine cards which are not perforated, these record cards will be directed into the reject pocket designated R in Fig. 4. If the operator so desires, the same control card may be utilized for successive sorting runs but in some instances, it may be desired to have on hand a number of these control cards so that they may be placed in the supply hopper at the termination of each sorting run without the necessity of removing them from the reject pocket R into which they will be normally directed.

Attention is directed to the fact that it is preferable to place a few blank record cards upon the last perforated record card to be sorted in each sorting run, thereby delaying for a few cycles of the machine the operation of the mechanism which effects the automatic selection of the next set of sorting pockets to be utilized and the selection of the next card column to control sorting operations. These imperforate records will, of course, be directed into the reject pocket R. The above arrangement is preferably followed because it will insure that all the perforated record cards utilized in one sorting run will be directed into the sorting pockets before there is a change in the position of the carriage carrying the two series of card pockets, or a change in the position of the carrier 26 so that the brushes 18 will be operatively correlated with the next card column.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a sorting machine for sorting out during each sorting run a group of records passed through the machine in accordance with the classification designations of the records, the combination of two sets of sorting compartments, analyzing means for analyzing the classification designations of said records, a sorting mechanism controlled by said analyzing means for sorting said records into a set of compartments in operative association therewith, a main operating means for said sorting machine, means to effect by said operating means a relative movement between said sets of compartments and said sorting mechanism to operatively associate one of said sets of compartments with said sorting mechanism, and means for causing the operation of said last named means upon the completion of sorting operations for a group of records sorted into one set of compartments to thereby operatively associate the other set of sorting compartments with the sorting mechanism for receiving records sorted therein during the next sorting run.

2. In a sorting machine for sorting out during each sorting run a group of records passed through the machine in accordance with the classification designations of the records and through which a control card is passed at the termination of each sorting run, the combination of two sets of sorting compartments, analyzing means for analyzing the classification designations of said records, a sorting mechanism controlled by said analyzing means for sorting said records into a set of compartments in operative association therewith, means to effect a relative movement between said sets of compartments and said sorting mechanism to operatively associate one of said sets of compartments with said sorting mechanism, and means effective and responsive to the passage of said control card indicating the completion of sorting operations for a group of records sorted into one set of compartments for causing the operation of said last named means to thereby operatively associate the other set of sorting compartments with the sorting mechanism for receiving records sorted therein during the next sorting run.

3. In a sorting machine for sorting out during each sorting run a group of records passed through the machine in accordance with the classification designations of the records, the combination of two sets of sorting compartments, analyzing means for analyzing the classification designations of said records, devices for correlating said analyzing means with a succeeding card column of said records to cause under control of such card column the sorting of records during the next sorting run, a sorting mechanism controlled by said analyzing means for sorting said records into a set of compartments in operative association therewith, means to effect a relative movement between said sets of compartments and said sorting mechanism to operatively associate another one of said sets of compartments with said sorting mechanism at the completion of each sorting run, and means effective and responsive to the completion of sorting operations for a group of records sorted into one set of compartments for causing the operation of said last named means and said devices to concomitantly operatively associate the other set of sorting compartments with the sorting mechanism and said analyzing means with the succeeding card column of the records to be sorted during the next sorting run.

4. In a sorting machine for sorting out during each sorting run a group of records passed through the machine in accordance with the classification designations of the records and including a control card passed through the machine at the termination of each sorting run, the combination of two sets of sorting compartments, a driving means for said machine, analyzing means for analyzing the classification designations of said records, devices for correlating said analyzing means with a succeeding card column of said records to cause under control of such card column the sorting of records during the next sorting run, a sorting mechanism controlled by said analyzing means for sorting said records into a set of compartments in operative association therewith, means to effect a relative movement between said sets of compartments and said sorting mechanism to operatively associate another one of said sets of compartments with said sorting mechanism, means including a one revolution clutch for connecting said driving means with said devices and said last recited means to cause their operation, and means effective and responsive to the passage of the control card at the completion of sorting operations for a group of records sorted into one set of compartments at the completion of each sorting run for causing the engagement of said clutch to cause the operation of said means to effect the relative movement and said devices, to concomitantly operatively associate the other set of sorting compartments with the sorting mechanism and said analyzing means with the succeeding card column of the records to be sorted during the next sorting run.

5. In a sorting machine, means for analyzing classification designations of records to be sorted, a sorting mechanism controlled by said analyzing means, two sets of sorting compartments associated with said sorting mechanism into one of which sets of compartments said records are sorted during a sorting run, means responsive and effective upon the completion of each sorting run including the last sorting run to operatively associate the next set of compartments to be utilized with said sorting mechanism to receive records directed therein by the sorting mechanism during the next sorting run, and upon completion of the last sorting run presenting for access to the operator records directed into the set of compartments utilized during that run, means for initiating and effecting the continued operation of said sorting mechanism, devices for operatively associating said analyzing means with a succeeding card column of the records after each sorting run, and means responsive to the position of said devices which operatively correlates the last card column with said analyzing means for rendering said means which effects the continued operation of the sorting mechanism ineffective to thereby automatically terminate the operation of the sorting mechanism of the machine.

6. In a sorting machine for sorting out during each sorting run a group of records passed through the machine in accordance with the classification designations of the records, the combination of a movable carriage carrying two sets of sorting compartments, a single reject compartment which is stationary with respect to said carraige, analyzing means for analyzing the classification designations of said records, a sorting mechanism controlled by said analyzing means for sorting said records into either one of said sets of compartments, but directing certain records to said reject pocket irrespective of the set of compartments utilized, means to position said carriage to effect a relative movement between said sets of compartments and said sorting mechanism to operatively associate one of said sets of compartments with said sorting mechanism, and means effective and responsive to the completion of sorting operations for a group of records for causing the operation of the positioning means to thereby operatively associate the next set of compartments to be utilized with the sorting mechanism for receiving records sorted therein during the next sorting run.

MICHAEL MAUL.